(12) United States Patent
Stuck et al.

(10) Patent No.: US 7,787,182 B2
(45) Date of Patent: Aug. 31, 2010

(54) DIFFRACTIVE OPTICAL SECURITY DEVICE

(75) Inventors: Alexander Stuck, Wettingen (CH); Harald Walter, Kilchberg (CH); Marc Schnieper, Onex-Genève (CH)

(73) Assignee: CSEM Centre Suisse d'Electronique et de Microtechnique SA - Recherche et Developpement, Neuchatel (CH)

( * ) Notice: Subject to any disclaimer, the term of this patent is extended or adjusted under 35 U.S.C. 154(b) by 466 days.

(21) Appl. No.: 11/526,519

(22) Filed: Sep. 25, 2006

(65) Prior Publication Data

US 2007/0081246 A1    Apr. 12, 2007

(30) Foreign Application Priority Data

Sep. 26, 2005    (EP)    ................................ 05405557

(51) Int. Cl.
    *G02B 5/18*    (2006.01)
(52) U.S. Cl. ....................................... 359/569; 359/572
(58) Field of Classification Search ................. 359/569, 359/2, 572
    See application file for complete search history.

(56) References Cited

U.S. PATENT DOCUMENTS

| 4,484,797 A | 11/1984 | Knop et al. |
| 4,705,356 A | 11/1987 | Berning et al. |
| 5,820,971 A | 10/1998 | Kaule et al. |
| 2003/0058491 A1* | 3/2003 | Holmes et al. ................. 359/2 |
| 2007/0247714 A1* | 10/2007 | Schnieper et al. ........... 359/558 |

FOREIGN PATENT DOCUMENTS

| EP | 1 775 142 A1 | 4/2007 |
| WO | WO 03/059643 | 7/2003 |
| WO | WO 03/082598 | 10/2003 |

OTHER PUBLICATIONS

Gale, M.T., et al. "Zero-order diffractive microstructures for security applications," Proceedings of the SPIE, SPIE, Bellingham, VA, US, vol. 1210, Jan. 15, 1990, pp. 83-89.
Gale, M.T., "Zero-Order Grating Microstructures," in R.L. van Renesse, Optical Document Security, $2^{nd}$ Ed., pp. 267-287. 1998.
Zimmermann et al., J. Mater. Res., vol. 8, No. 7, 1998, pp. 1742-1748.
"Doubling Coupling-Out Efficiency in Organic Light-Emitting Devices Using a Thin Silica Aerogel Layer," ADV. Mater, 13, 2001, pp. 1149-1152.

* cited by examiner

*Primary Examiner*—Joshua L Pritchett
(74) *Attorney, Agent, or Firm*—Weingarten, Schurgin, Gagnebin & Lebovici LLP

(57) ABSTRACT

The diffractive optical device (1) can be used as a security device in the fields of authentication, identification and security. It comprises a zero-order diffractive color filter (3). The diffractive color filter may consist of a microstructured high-index layer (32) embedded between two low-index layers (31, 33). A mirror layer (4) for reflecting towards the diffractive color filter (3) at least part of light transmitted through the diffractive color filter (3) are provided beneath the diffractive color filter. Thanks to the mirror layer (4), the device (1) has a much higher reflected intensity and much more complex spectra than prior-art diffractive color filters.

21 Claims, 4 Drawing Sheets

Fig. 5(a)
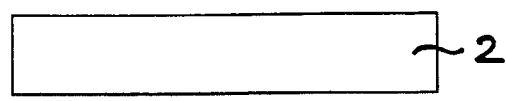
Fig. 5(b)
Fig. 5(c)
Fig. 5(d)
Fig. 5(e)
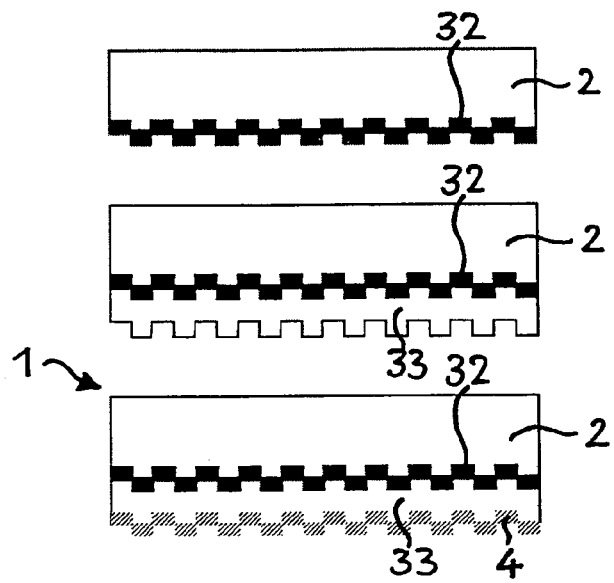
Fig. 6(a)
Fig. 6(b)
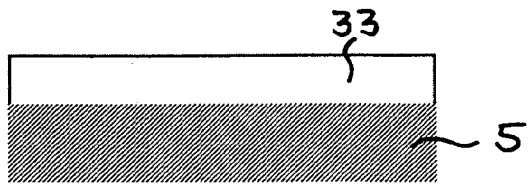
Fig. 6(c)
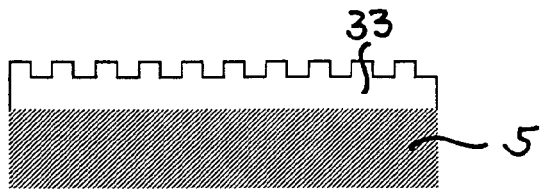
Fig. 6(d)
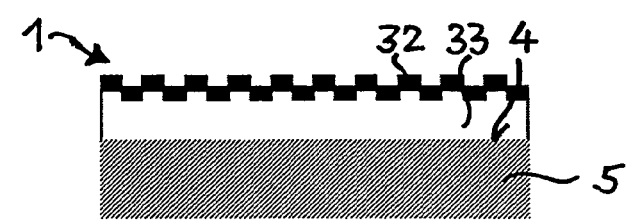

DIFFRACTIVE OPTICAL SECURITY DEVICE

This application claims priority to European application No. EP-05 405 557.9 filed Sep. 26, 2005.

FIELD OF THE INVENTION

This invention relates to a diffractive optical device and a method for its manufacturing, according to the preambles of the independent claims. Particularly, but not exclusively, the invention relates to security devices using optical filters based on zero-order diffractive microstructures combined with a mirror layer structure for use as security devices in the fields of authentication, identification and security. In more detail, it is related to the such zero-order diffractive filters having special color effects—e.g. color change upon tilting and/or rotation—for use as security devices in a variety of applications like (but not restricted to) banknotes, credit cards, passports, tickets, document security, anti-counterfeiting, brand protection and the like.

BACKGROUND OF THE INVENTION

It is state of the art to use diffractive optically variable image devices (DOVIDs) like holograms for anti-counterfeiting of banknotes or credit cards. Further magnetic codes or fluorescent dyes are often used to prove the originality of items. Unfortunately, counterfeiters have already produced forged high-quality versions of devices using all those techniques. Especially DOVIDs possess only a low level of security, because non-experts generally do not know how the holographic image should look. Therefore, there is a need for novel security devices that are more difficult to counterfeit.

Optically variable inks (OVIs), as disclosed in U.S. Pat. No. 4,705,356, provide a higher level of security, as it is easier for non-experts to observe a color change than a complex image. Although OVIs are also difficult to manufacture, and therefore seem to be secure, their effect can be closely mimicked with color-shifting inks used for decorative purposes that are commercially available from several companies such as JDS Uniphase Corp., San Jose, Calif. This decreases the value of OVIs as anti-counterfeiting tool.

In U.S. Pat. No. 4,484,797, color filters with zero-order microstructures are described for use as authenticating devices. Illuminated even with non-polarized, polychromatic light, such devices show unique color effects upon rotation and therefore can be clearly identified. However, due to the fact that the filters are based on the resonant reflection of a leaky waveguide, they possess narrow reflection peaks and thus produce weak color effects. Moreover, the possibilities for varying the color effect are limited.

WO-03/059643 also describes zero-order diffractive gratings for use in security elements. The elements have the same drawbacks as the filters in U.S. Pat. No. 4,484,797.

Zero-order diffractive filters illuminated by unpolarized polychromatic visible light are capable of separating zero-diffraction-order output light from higher-diffraction-order output light. Two examples of such filters 101 are shown in FIG. 1. The filters 101 consist, for instance, of parallel grating lines of a material 132 with relatively high index of refraction surrounded by materials 131, 133 with lower indices of refraction. The high-index layer 132 acts as a leaky waveguide. The materials 131, 133 above and below the waveguide 132 can have equal or different indices of refraction and one of them can even be air. The grating lines are parallel to the y direction. $\Lambda$ denotes the period of the grating, p the width of the grating grooves, c the thickness of the high-index-of-refraction coating (black), t the depth of the grating structure, $\Theta$ the incidence angle and $\phi$ the rotation angle. $\phi=0°$ is defined as incident direction perpendicular to the grating lines (i.e., a straight line lying in the (xz) plane).

These filters 131 possess characteristic reflection and transmission spectra depending on the viewing angle and the orientation of the grating lines with respect to the observer (see M. T. Gale, "Zero-Order Grating Microstructures", in R. L. van Renesse, Optical Document Security, $2^{nd}$ Ed., pp. 267-287). Other parameters influencing the color effect are, for example, the period $\Lambda$, the thickness c of the high-index layer 132, the grating depth t, the fill factor $f=p/\Lambda$ and the shape of the microstructure (rectangular, sinusoidal, or more complex). In reflection, the filters 101 show a color which varies with the viewing angle. As the filters reflect light in the zeroth order, this viewing angle is equal to the incidence angle $\Theta$. As long as the materials 131-133 used show no absorption, the transmission spectra are the complement of those in reflection. A characteristic feature of such filters 101 is a color change upon rotation by 90°. However, the intensity of light reflected by such filters 101 is low.

SUMMARY OF THE INVENTION

An object of the present invention is to mitigate at least some of the drawbacks of the prior art as described above. In particular, it is an object of this invention to provide a diffractive optical device that provides a higher level of security against counterfeiting. If is a further object of this invention to provide a low-cost method for manufacturing such a device.

This object and other objects are solved by the device as defined in the first claim. Preferred, advantageous or alternative features of the invention are set out in dependent claims.

In a first aspect, the present invention provides security devices and methods for producing such devices that are more forgery-resistant. Such devices comprise at least one zero-order diffractive filter combined with a mirror-layer structure behind the filter in a distance that allows interference effects of visible light between the mirror-layer structure and the filter. This combination is capable of producing novel, very strong color effects that are distinctly different from common color effects. Even non-experts can therefore easily identify such security devices. At the same time these security devices are very difficult to duplicate due to the high number of parameters influencing the color effects.

In a second aspect, the present invention provides such forgery-resistant devices having characteristic color effects that can be measured easily and clearly identified even with low-cost handheld devices.

In a third aspect, the invention provides methods of mass-producing such forgery-resistant devices at low cost using various replication and coating techniques. Some of the production methods are even free of expensive vacuum-coating processes.

The devices can be in the form of hot or cold transferable labels, adhesive tags, direct paper, and the like. They distinctly decrease the possibility of counterfeiting compared to prior-art security devices including security-printing techniques, optically variable devices (OVDs) like optically variable inks (OVI) or diffractive optically variable image devices (DOVIDs), UV/IR fluorescent dyes, magnetic stripes etc.

More specifically, the diffractive optical device according to the invention comprises a zero-order diffractive color filter and reflection means for reflecting towards the zero-order diffractive color filter at least part of light transmitted through the diffractive color filter, the reflection means being in a distance to the zero-order diffractive color filter in order to cause interference effects of said light between the reflection means and the zero-order diffractive color filter.

In the inventive method for manufacturing the diffractive optical device according a substrate is provided and a zero-order diffractive color filter is manufactured on the substrate. Reflection means for reflecting towards the diffractive color filter at least part of light transmitted through the diffractive color filter are further provided, the reflection means being in a distance to the zero-order diffractive color filter in order to cause interference effects of said light between the reflection means and the zero-order diffractive color filter.

Thanks to its reflection means, the device according to the invention has a much higher reflected intensity and much more complex spectra than prior-art diffractive color filters.

BRIEF DESCRIPTION OF THE DRAWINGS

Embodiments of the invention and, for comparison, a prior-art device are described in greater detail hereinafter relative to the attached schematic drawings.

FIG. 5 shows an embodiment of a manufacturing method for a device according to the invention, called "inverse setup".

FIG. 6 shows another embodiment of a manufacturing method for a device according to the invention, called "direct setup".

DESCRIPTION OF PREFERRED EMBODIMENTS

Figure 1A:
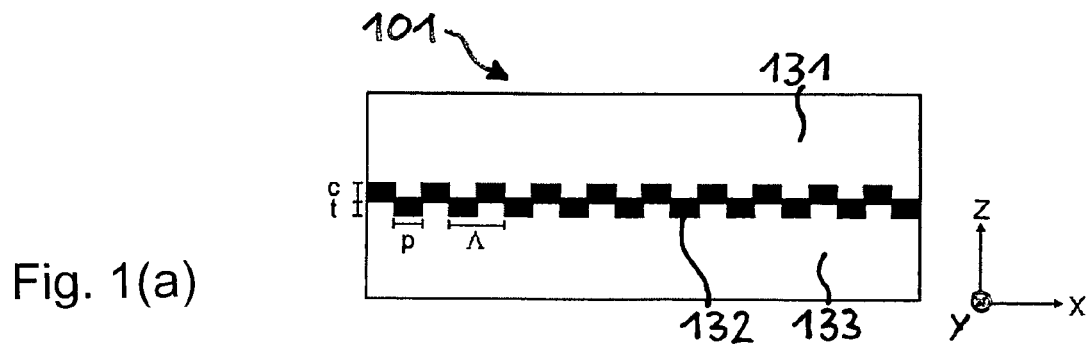
FIG. 1 shows schematic cross-sectional views of two zero-order diffractive filters according to the prior art, with (a) rectangular and (b) sinusoidal profiles of the grating lines.

FIG. 2 shows three possible embodiments of a device 1 according to the invention in cross sections. The device 1 comprises a sheet-like substrate 2 essentially transparent for visible light. Illuminating light 9 impinges on a first surface 21 of the substrate 2, the top surface. A second surface 22 of the substrate 2 bears a two- or three-dimensional diffractive structure 3, preferably a diffractive microstructure, that acts as a filter structure for the illuminating light 9 incident from the top through the substrate 2. The diffractive structure 3 comprises a high-index layer of an essentially transparent material 32 with a relatively high index of refraction, surrounded by two low-index materials 31, 33 with indices of refraction lower than that of the high-index layer 32. The layers 31-33 of the diffractive microstructure 3 may comprise a material or a combination of materials such as epoxy, acrylate, polycarbonate, UV-curable sol-gel material, silicon oxide, carbide, diamond, carbon, carbon derivative, magnesium fluoride, ZnO, ZnS, and/or titanium oxide. They also may comprise organic materials filled with inorganic nano-particles.

The high-index layer 32 acts as leaky waveguide. The high-index layer 32 is inhomogeneous in at least one direction of a plane defined by the substrate surface 22. In the examples of FIG. 2, the diffractive structure 3 comprises a ruled grating. The ruled grating is essentially a two-dimensional structure.

A plurality of such gratings can be arranged one above the other within the second low-index layer 33, thus making a three-dimensional diffractive structure 3. If the low-index materials 31, 33 have indices of refraction well below 1.5, the high-index material 32 can even be a layer with an index of refraction of about 1.5, e.g., a polymer layer. The important parameter is the refractive-index difference between the high index and each of the low indices. A wet-process-able class of high-index materials 32 are nano-sized particles of a high-index material embedded in a polymeric matrix. An example are mixtures of PbS nano-particle and gelatine that have indices of refraction of up to 2.5 (Zimmermann et. al. J. Mater. Res., Vol. 8, No. 7, 1993, 1742-1748). Mixtures containing $Al_2O_3$, $ZrO_2$ or $TiO_2$ particles are also possible.

Figure 1B:
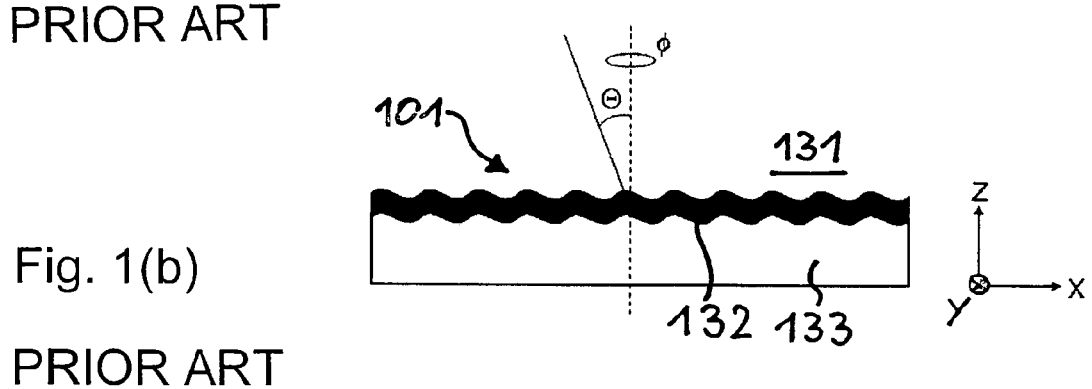

The materials 31, 33 above and below the high-index layer 32 can have equal or different indices of refraction, and one of them can even be air. The parameters influencing the color effect besides those described with reference to FIG. 1 are described in the next paragraph.

The device 1 according to the invention further comprises a reflecting structure, e.g., a mirror layer structure 4, arranged behind (or beneath) the diffractive microstructure 3. The reflecting structure is also designated as reflection means. Thanks to the mirror layer structure 4, security devices 1 with much higher reflected intensity and much more complex spectra can be obtained than in the prior art. Since there are so many additional parameters determining the color effect, forgers cannot use an easy trial-and-error approach for duplication. Moreover, such security devices 1 can be made machine readable due to the strong effects. The mirror layer structure 4 can be spectrally selective or broadband reflective. Preferred mirror layer structures 4 are semi-transparent (visible transmission T>75%) or fully reflective (T<10%). Metallic mirror layers, dielectric mirror layers, dielectric mirror-layer stacks (e.g., a stack of alternating high- and low-index-of-refraction layers), Fabry-Perot-type mirror-layer stacks and the like are suitable.

Figure 2A:
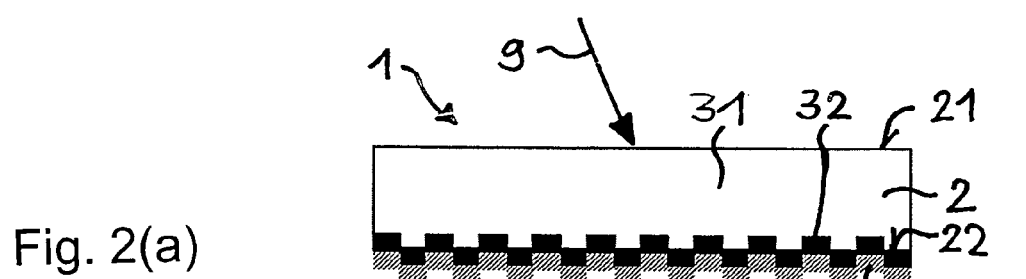
FIG. 2 shows schematic cross-sectional views of three zero-order diffractive-microstructure devices according to the invention.

The simplest embodiment of the device 1 according to the invention has a mirror layer structure 4 next to or in close contact with the waveguide layer 32, as shown in FIG. 2(a). Hereby interference effects in the waveguide layer 32 are enhanced and modified.

Figure 2B:
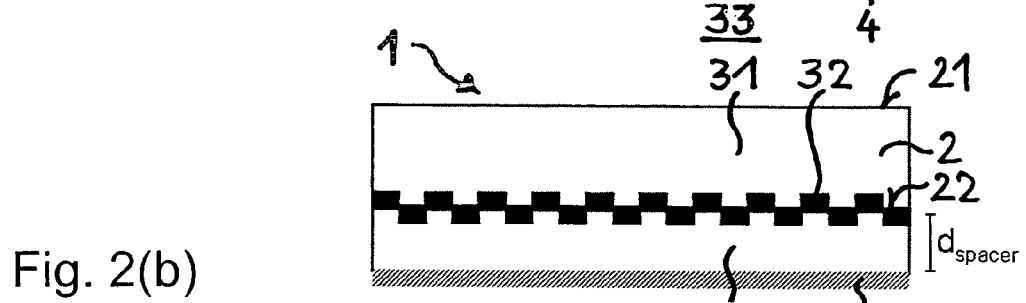
Figure 2C:
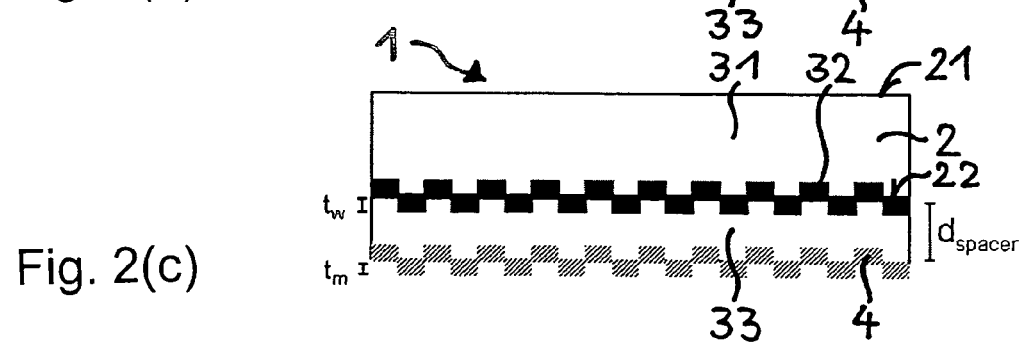

By placing an additional, at least in the visible spectral range partially transparent, spacer layer 33 (e.g., Polycarbonate PC, n=1.59 at 550 nm) with an index of refraction lower than the waveguide layer 32 (e.g., Zinc sulphide ZnS, n=2.38 at 550 nm) and with a thickness $d_{spacer}$ between the waveguide layer 32 and the mirror layer structure 4, additional interference effects can take place. FIGS. 2(b) and 2(c) show such devices 1.

The mirror layer structure 4 can be flat, as shown in FIG. 2(b). By using techniques such as correlated structuring, it can be fabricated to possess essentially the same microstructure (period and grating orientation) as the waveguide layer 32; see FIG. 2(c). $t_w$ denotes the structure depth of the waveguide layer 32 and $t_m$ the depth of the correlated grating structure in the mirror layer structure 4. Even different microstructures in the waveguide layer 32 and the mirror layer structure 4 are possible with additional structuring steps before deposition of the mirror layer structure 4. Ways for easily producing flat or micro-structured mirror layer structures 4 are described below in this document. The correlation between the microstructure (depth and shape) of the waveguide layer 32 and of the mirror layer structure 4 strongly modifies the reflection spectra of the security device 1. Suitable and preferred values of the grating parameters are listed in Table I.

TABLE I

| Parameter | Suitable range | Preferred range |
| --- | --- | --- |
| Period Λ (nm) | 100-900 | 250-500 |
| Fill factor f = p/Λ | 0.2-0.8 | 0.3-0.7 |
| Thickness c of waveguide layer 32 (nm) | 30-900 | 70-250 |
| Structure depth $t_w$ (nm) | 30-500 | 80-200 |
| Structure correlation $t_m/t_w$ | 0-1 | 0-1 |
| Thickness $d_{spacer}$ of spacer layer 33 (nm) | 0-5000 | 50-1500 |

By placing the mirror layer structure 4 below a stack of two or more zero-order diffractive filters 32 (not shown), other, more complex spectra and color effects can be obtained. If the distance between the diffractive microstructures 32 in the stack is below 5 μm, additional interference effects modify the reflection spectra.

Another possible configuration (not shown) comprises a zero-order diffractive microstructure 3 with grating lines crossed by an crossing angle ζ. If the grating lines are crossed perpendicularly (ζ=90°), the rotation effect is not greater than a rotation of 45°. This produces a very eye-catching effect and is easily recognized even by persons not conversant with these devices 1. Other crossing angles ζ will give another symmetry of rotation and therefore other color effects upon rotation of the device 1.

All configurations described herein can be combined with other security technologies like OVIs, holograms, fluorescent dyes, micro- or nano-printing and the like. If a metallic mirror 4 is used, especially demetallization of defined areas to form letters or numbers and the like can be easily combined with the technique described in this invention. Demetallization is widely used in the banknote market.

As long as the distance $d_{spacer}$ between the diffractive microstructure 3 and the mirror layer structure 4 is too large for interference effects in the visible spectral range, the reflected spectrum is the same as the incident spectrum (neglecting absorption in the transparent layers 31-33 and assuming a perfect mirror). If $d_{spacer}$ becomes smaller than about 5 μm, interference effects modify the reflected spectra distinctly. For instance, the intensity diffracted in the higher orders is modified leading to unusual visible color effects in zeroth order which are even stronger and easier to recognize than the effects obtained with the mirror layer structure 4 next to the waveguide layer 32. Comparisons of the color spectra of a prior-art filter and a device 1 according to the invention are made in FIGS. 3 and 4.

Figure 3A:
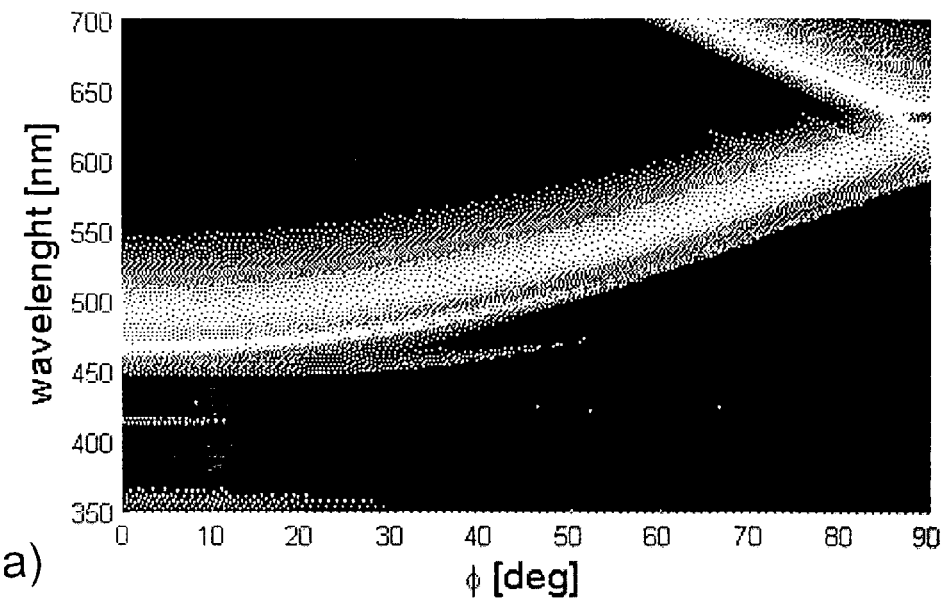
FIG. 3 shows the calculated reflected intensity in the zeroth order over wavelength (vertical axis) and rotational angle φ (horizontal axis) for (a) a prior-art filter, and (b) a device according to the invention.
Figure 3B:
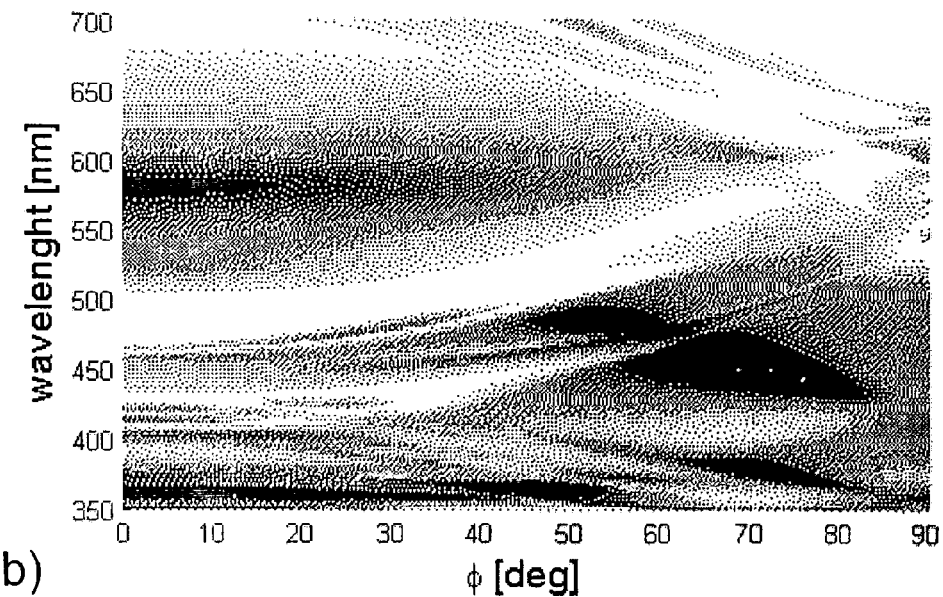

FIG. 3 shows the calculated (Rigorous Coupled Wave Analysis) reflected intensity in the zeroth order over wavelength and rotational angle φ for an incidence angle Θ of 30°. Dark areas denote a low reflected intensity and bright areas a high reflected intensity. FIG. 3(a) shows calculation results for a prior-art filter as shown in FIG. 1(a), and FIG. 3(b) for a device 1 according to the invention according to FIG. 2(c). Both devices show a color change upon rotation, but the device 1 according to the invention reflects much more of the incident unpolarized polychromatic light which results in a brighter color effect, which is thus easier to recognize.

Figure 4A:
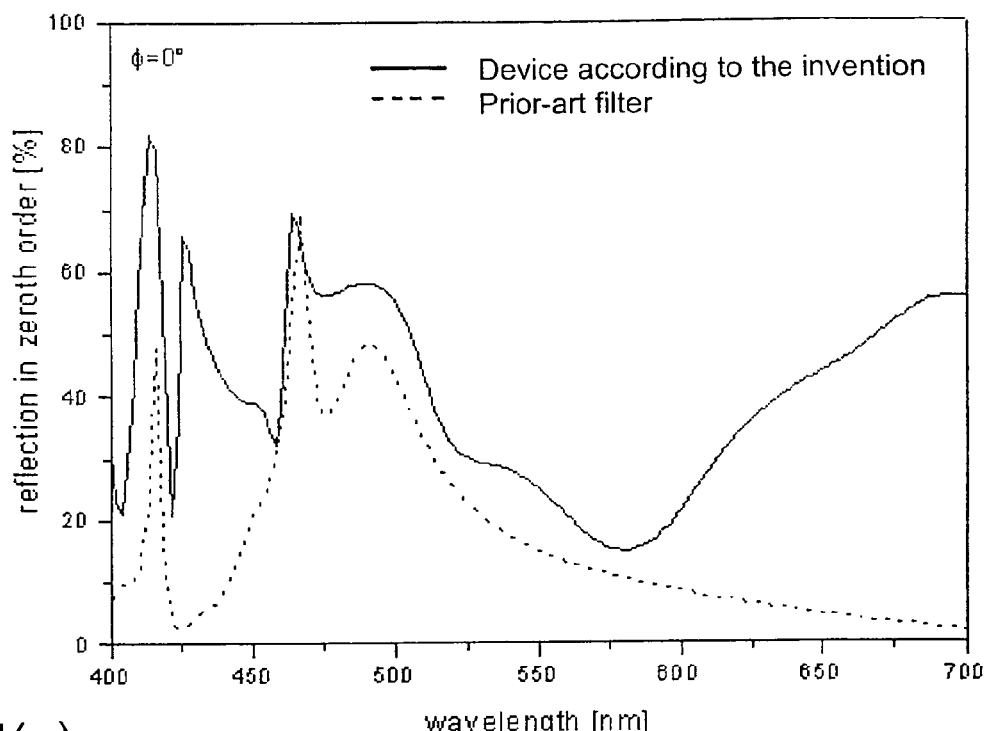
FIG. 4 shows reflection spectra in zeroth order for a device according to the invention (continuous line) and a prior-art filter (dashed line) for (a) φ=0° and (b) φ=90°.
Figure 4B:
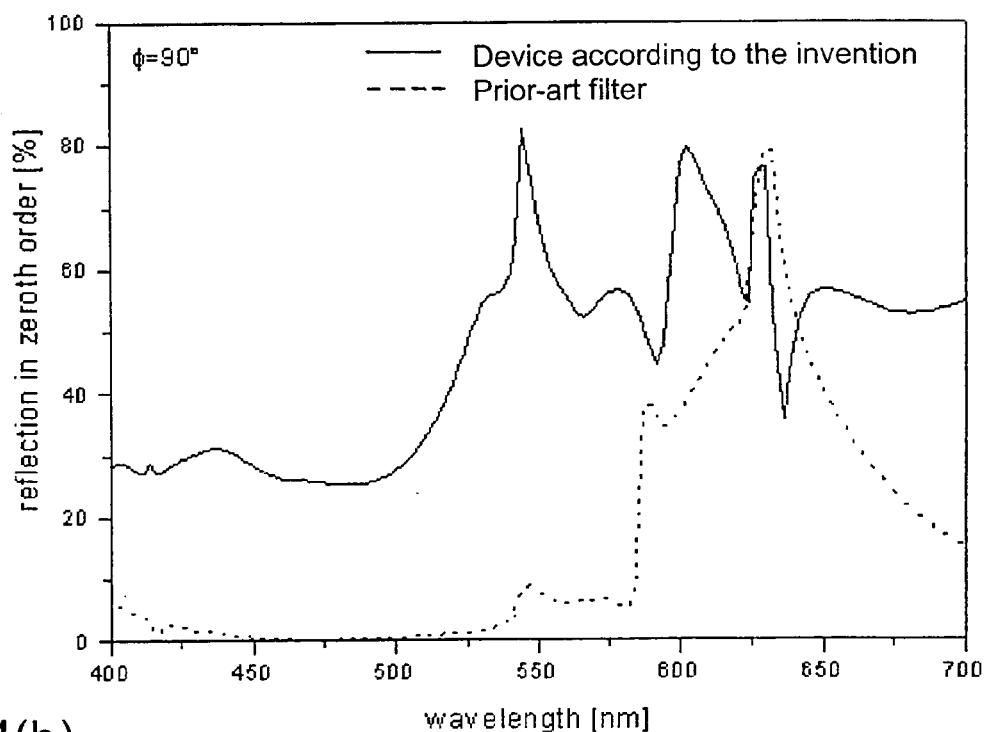

FIG. 4 shows reflection spectra in zeroth order for a prior-art filter (dashed line) and a device 1 according to the invention (continuous line). The diagram of FIG. 4(a) was calculated with φ=0°, and the diagram of FIG. 4(b) with φ=90°. These spectra are vertical cuts in the corresponding plots in FIGS. 3(a) and 3(b). As can be seen, the device 1 according to the invention reflects for nearly every wavelength in the visible region of the spectrum more light than the prior-art filter, but still maintains a contrast between regions with high and low intensity that is high enough for producing the desired color effect.

In the following, methods for manufacturing the devices 1 according to the invention are described.

One method for manufacturing the device comprises the steps of embossing the diffractive microstructure in a transparent substrate 2 and subsequently depositing the desired layers on the diffractive microstructure (so-called inverse setup). In a first, simple embodiment (not shown), only a high-index layer (waveguide) 32 followed by a metallic mirror layer 4 are deposited on the substrate 2. This simple manufacturing method yields a device 1 as shown in FIG. 2(a).

FIG. 5 shows a second, more complex embodiment of a manufacturing method for the device 1 according to the invention. This method is also an "inverse-setup" method. A transparent polymeric foil 2 is used as a substrate (FIG. 5(a)). The foil 2 is embossed with a zero-order grating structure (FIG. 5(b)). The grating structure is coated with a high-index waveguide layer 32 (FIG. 5(c)). On top of the waveguide layer 32 a spacer layer 33 with a lower index of refraction and a well-defined thickness is deposited (FIG. 5(d)). Due to correlated structuring, the surface of the spacer layer 33 possesses a grating structure of the same period and orientation as the waveguide layer 32, although depth and shape may be changed. The last step is the deposition of a metallic mirror layer 4 which follows the structuring of the surface of the spacer layer 33 (FIG. 5(e)). In the finished device 1, the color effects are visible from the top, i.e., through the foil 2.

If appropriate materials are used, the coating step (can be performed before the embossing step. Thus the layer or layer stack is embossed together with the substrate 2. In a further embodiment (not shown), the substrate 2 can be coated by a very-low-index-of-refraction layer (n between 1.01 and 1.3) to enhance the contrast in the indices of refraction between the waveguide layer 32 and the substrate 2. Such layers are, e.g., porous coatings made of silica nanoparticles or so-called aerogels.

Low-cost mass production is achievable by continuous production techniques like roll-to-roll embossing of a flexible polymeric foil 2 and/or roll-to-roll wet or vacuum coating. The foil 2 can be, for example, acrylonitrile butadiene styrene ABS, polycarbonate PC, polyethylene PE, polyetherimide PEI, polyetherketone PEK, poly(ethylene naphthalate) PEN, poly(ethylene therephtalate) PET, polyimide PI, poly(methyl methacrylate) PMMA, poly-oxy-methylene POM, mono oriented polypropylene MOPP, polystyrene PS, polyvinyl chloride PVC and the like. The index of refraction of the substrate 2 should be preferably between 1.34 (fluorinated ethylen-propylen-copolymer FEP) and 1.64 (polysulfone PSU), advantageously between 1.49 (PMMA) and 1.59 (PC); all index-of-refraction values are given for a light wavelength of 589 nm. The thickness of the foil 2 is preferably between 5 μm and 200 μm, especially between 12 μm and 50 μm. The substrate 2 is microstructured with the gratings either before, in between, or after deposition of the layer stack 32, 33 on the substrate 2 with an adequate mastering tool, for example by, but not limited to, cold-, hot- or UV-embossing/stamping.

The waveguide layer 32 may be formed on the substrate 2 using vacuum coating techniques, for example chemical vapor deposition (CVD—especially PECVD, PICVD, PACVD), thermal or e-beam evaporation, pulsed laser deposition (PLD), sputtering for example DC- or RF-sputtering, etc. Wet coating can be done for example by printing, especially flexo-printing, gravure printing, ink-jet-printing or screen-printing, by curtain or dip coating, by spraying, by sol-gel processes, especially UV or thermal curable sol-gel technique, and/or the like. Applicable materials for the waveguide layer 32 possess an index of refraction higher than that of the substrate 2. For example, inorganic materials like, but not limited to, AlN, $Al_2O_3$, $HfO_2$, ITO, $Nb_2O_5$, $Si_3N_4$, SnN, $SnO_2$ (pure or doped with F (FTO) or Sb (ATO)), $TiO_2$, $Ta_2O_5$, $V_2O_5$, $WO_3$, ZnO (pure or doped with Al (AZO) or Ga (GZO)), ZnS, or $ZrO_2$ can be used. Possible, but not limited to, organic materials or lacquer containing them are highly brominated vinyl polymer, nitrocellulose NC, PC, PEI, PEN, PET, PI, polyphenylen, polypyrrol, PSU, polythiophen, polyurethane PU or polyvinyl-alcohol PVA. Other possible materials are mixtures of nano-particle and polymer like, but not limited to, $TiO_2$ and PVA or PbS and gelatine. The latter possess indices of refraction up to 2.5 (Zimmermann et. al. J. Mater. Res., Vol. 8, No. 7, 1993, 1742-1748).

For the advanced setup, a spacer layer 33 with an index of refraction lower than that of the waveguide layer 32 is deposited on top of the waveguide layer 32 by one of the methods mentioned above. Suitable inorganic materials include $AlF_3$, $Al_2O_3$, $BaF_2$, $CaF_2$, $MgF_2$, $SiO_2$, $WO_3$. Suitable organic materials or lacquer containing them include FEP, NC, PET, PMMA, PP, PS, polytetrafluorethylen PTFE, PVA, PVC. Very-low-index-of-refraction layers ($n_{low}$ close to 1.0) like aerogels or porous coatings are also possible. The index of refraction of sol-gel processed silica aerogel as described by Tsutsui et. al. ("Doubling Coupling-Out Efficiency in Organic Light-Emitting Devices Using a Thin Silica Aerogel Layer", Adv. Mater. 13, 2001, p. 1149-1152) is between 1.01 and 1.10.

For depositing the mirror layer structure 4, all above-mentioned methods can be used. Metallic mirrors need just one metallic layer to be deposited. For dielectric mirrors, one or more layers are deposited, preferably a stack of alternating high-index and low-index layers. Suitable materials for metallic mirrors are Aluminum Al, Chromium Cr, Copper Cu, Gold Au, Silver Ag, Titanium Ti and/or the like. Alloys of two or more metals are also possible. Another class of metallic mirrors are printable alloys or lacquers containing metallic nanoparticles.

In most cases the spacer layer 33 will possess a diffractive microstructure due to the correlated structuring in the coating process. Thus the (metallic) mirror 4 is likewise structured. The correlation between the grating structure in the substrate 2 and in the spacer layer 33 depends on the materials used, on the coating process and the coating parameters. A flat surface of the spacer layer 33 can be obtained, e.g., by using a polymeric material and heating it above the glass-transition temperature after the coating and drying step. The surface tension tends to smoothen the surface. After cooling the spacer layer-material below its glass-transition temperature, the flat surface is frozen. This flattening process can be easily implemented in roll-to-roll machines by rolling the coated foil over a heated roll. If desired, the flattened surface of the spacer layer 33 can be micro-structured, e.g., with another diffractive microstructure in an additional embossing step.

Another embodiment of the method for manufacturing devices 1 according to the invention consists in coating the desired layers in the reverse order. This so-called direct setup is shown in FIG. 6. A product 5 with a flat metallic reflecting surface 51 is used as a substrate; the reflecting surface forms the reflecting means 4 (FIG. 6(a)). Flat or micro-structured mirrors can be obtained depending on the structure of the substrate 5. The substrate 5 is coated with an embossable spacer layer 33 (FIG. 6(b)). A grating structure is embossed in the spacer layer 33 (FIG. 6(c)). The last step in this embodiment is the deposition of the waveguide layer 32 (FIG. 6(d)).

If necessary, an additional protective layer (not shown) can be deposited on top of the waveguide layer 32. The protective layer has an index of refraction lower than the waveguide layer, protects the microstructure from environmental stress and hampers attempts to analyze the device 1. It can be laminated or coated on top of the waveguide layer 32. If the substrate 5 is already a mirror, e.g., a product with a metallic surface or a metal foil, for example Al—, Au—, Cu—, Fe—, Ni—, Sn—, steel-foil etc., only the waveguide layer 32 and, if required, the spacer layer 33 have do be deposited. The coating and structuring techniques as well as the applicable materials are the same as for the inverse setup described with reference to FIG. 5. In the finished device 1, the color effects are visible from the top, i.e., from the side of the waveguide layer 32.

The devices 1 according to the invention can be used as security devices in the form of hot- or cold-transferable labels, adhesive tags or directly on products.

This invention is not limited to the preferred embodiments described above, to which variations and improvements may be made, without departing from the scope of protection of the present patent.

LIST OF REFERENCE SIGNS

1 Diffractive optical device
2 Substrate
21 Top surface of the substrate
22 Bottom surface of the substrate
3 Diffractive color filter
31, 33 Low-index media
32 High-index medium
4 Reflection means
5 Product with reflecting surface
51 Reflecting surface of the product
9 Incident light
101 Known Filter
131, 133 Low-index media
132 High-index medium

The invention claimed is:

1. A diffractive optical device enabling special color effects viewable from a viewing direction, said diffractive optical device comprising
 a zero-order diffractive color filter, wherein said zero-order diffractive color filter comprises at least two materials with different indices of refraction, said at least two materials forming a diffractive structure, wherein said diffractive structure has a grating depth ($t_w$) between 30 nm and 500 nm, said at least two materials comprising an essentially transparent high-index layer and materials surrounding said high-index layer, said high-index layer comprising said grated structure, said high-index layer having a relative high index of refraction compared to an index of refraction of materials surrounding said high-index layer;
 a reflecting structure; and
 a spacer layer sandwiched between said zero-order diffractive color filter and said reflecting structure;
 wherein said reflecting structure is on the backside of said spacer layer with respect to said viewing direction and is an essentially uniform distance ($d_{spacer}$) between 50 nm and 1500 nm from said zero-order diffractive color filter;

said high-index layer thus acting as a leaky waveguide for light incident thereon and making zero-order diffraction and a rotation color effect viewable from said viewing direction; and wherein said reflecting structure reflects towards said zero-order diffractive color filter at least part of light transmitted through said zero-order diffractive color filter in order to cause enhanced interference effects between light reflected from said reflecting structure and light leaking out of said leaky waveguide.

2. The diffractive optical device according to claim 1, wherein the reflecting structure comprises at least one of a metallic layer and a stack of dielectric layers with alternating low and high indices of refraction.

3. The diffractive optical device according to claim 2, wherein the metallic layer is semitransparent.

4. The diffractive optical device according to claim 1, wherein the diffractive structure has a square, rectangular, sinusoidal or triangular profile.

5. The diffractive optical device according to claim 1, wherein the diffractive structure comprises a stack of alternating low-index layers and high-index layers.

6. The diffractive optical device according to claim 1, wherein the diffractive structure has a grating period ($\Lambda$) between 100 nm and 900 nm.

7. The diffractive optical device according to claim 6, wherein the diffractive structure has a grating period ($\Lambda$) between 250 nm and 500 nm.

8. The diffractive optical device according to claim 1, wherein at least one interface of the reflecting structure has a diffractive structure.

9. The diffractive optical device according to claim 8, wherein the diffractive structure of the reflecting structure and the diffractive structure of the diffractive color filter have a structure correlation ($t_m/t_w$) between 0 and 1.

10. The diffractive optical device according to claim 8, wherein at least one interface of the reflecting structure has a diffractive structure that essentially corresponds to the diffractive structure of the diffractive color filter.

11. The diffractive optical device according to claim 1, wherein the diffractive optical device is essentially sheet-like and has an illumination surface onto which illuminating light impinges, the diffractive color filter lying beneath the illumination surface and the reflecting structure lying beneath the diffractive color filter.

12. The diffractive optical device according to claim 11, wherein a foil essentially transparent in the visible electromagnetic spectrum forms a substrate of the diffractive optical device, and a surface of the foil turned away from the illumination surface bears the diffractive color filter and the reflecting structure.

13. The diffractive optical device according to claim 11, wherein a reflecting surface of an object forms a substrate of the diffractive optical device, and the reflecting surface forms the reflecting structure and bears the diffractive color filter.

14. Use of the diffractive optical device according to claim 1 as a security device in at least one of the fields of authentication, identification and security.

15. The diffractive optical device according to claim 1, wherein the reflecting structure comprises at least one of a metallic layer and a stack of dielectric layers with alternating low and high indices of refraction;
the metallic layer is semitransparent;
the diffractive color filter comprises at least two materials with different indices of refraction, said at least two materials forming a diffractive structure;
the diffractive structure has a square, rectangular, sinusoidal or triangular profile;
the diffractive structure comprises a stack of alternating low-index layers and high-index layers;
the diffractive structure has a grating period ($\Lambda$) between 100 nm and 900 nm;
the diffractive structure has a grating depth ($t_w$) between 30 nm and 500 nm;
at least one interface of the reflecting structure has a diffractive structure;
the diffractive structure of the reflecting structure and the diffractive structure of the diffractive color filter have a structure correlation ($t_m/t_w$) between 0 and 1;
the diffractive optical device is essentially sheet-like and has an illumination surface onto which illuminating light impinges, the diffractive color filter lying beneath the illumination surface and the reflecting structure lying beneath the diffractive color filter; and
one of a foil essentially transparent in the visible electromagnetic spectrum forms a substrate of the device, and a surface of the foil turned away from the illumination surface bears the diffractive color filter and the reflecting structure, and a reflecting surface of an object forms a substrate of the device, and the reflecting surface forms the reflecting structure and bears the diffractive color filter.

16. Use of the diffractive optical device according to claim 15 as a security device in at least one of the fields of authentication, identification and security.

17. The diffractive optical device according to claim 15, wherein the diffractive structure grating period ($\Lambda$) is between 250 nm and 500 nm.

18. The diffractive optical device according to claim 15, wherein the diffractive structure has a grating depth (tw) between 80 nm and 200 nm.

19. The diffractive optical device according to claim 15, wherein at least one interface of the reflecting structure has a diffractive structure that essentially corresponds to the diffractive structure of the diffractive color filter.

20. The diffractive optical device according to claim 1, wherein the diffractive structure has a grating depth (tw) between 80 nm and 200 nm.

21. A method of manufacturing a diffractive optical device that enables special color effects viewable from a viewing direction, said method comprising the steps of:

providing a substrate;
manufacturing a zero-order diffractive color filter on said substrate, wherein said zero-order diffractive color filter comprises at least two materials with different indices of refraction, said at least two materials forming a diffractive structure, wherein said diffractive structure has a grating depth ($t_w$) between 30 nm and 500 nm, said at least two materials comprising an essentially transparent high-index layer and materials surrounding said high-index layer, said high-index layer comprising said grated structure, said high-index layer having a relative high index of refraction compared to an index of refraction of materials surrounding said high-index layer;
providing a reflecting structure; and
providing a spacer layer, having a thickness between 50 nm and 1500 nm, between said zero-order diffractive color filter and said reflecting structure, wherein said reflecting structure is on a backside of said spacer layer with respect to the viewing direction.

* * * * *